Feb. 27, 1940.  A. G. F. WALLGREN  2,191,901
BEARING
Filed Feb. 26, 1936  3 Sheets-Sheet 1
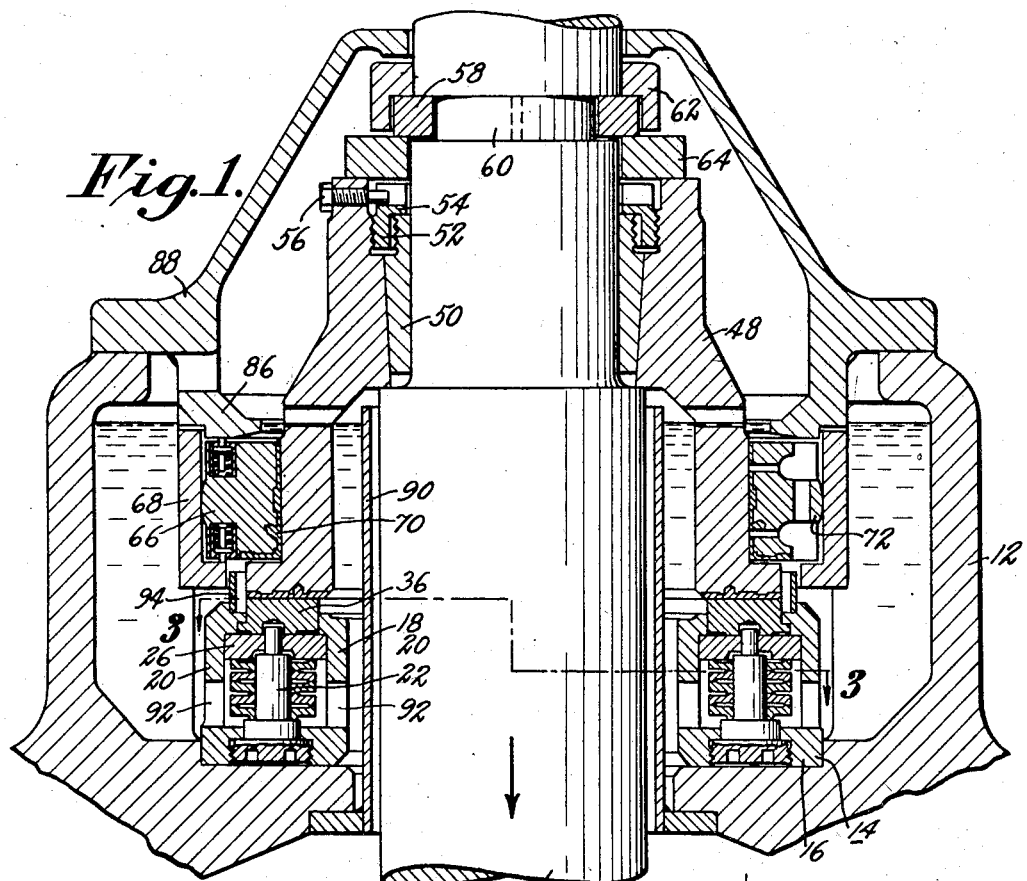
Fig.1.
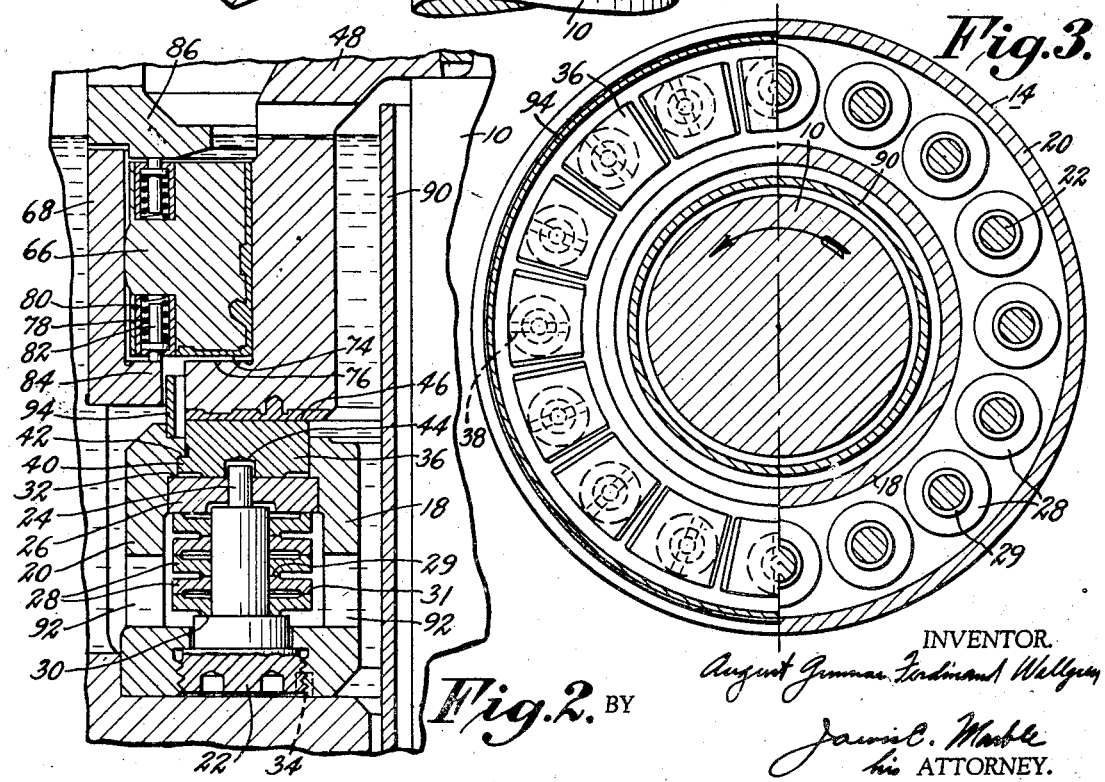
Fig.2.
Fig.3.
INVENTOR.
August Gunnar Ferdinand Wallgren
BY James C. Marble
his ATTORNEY.

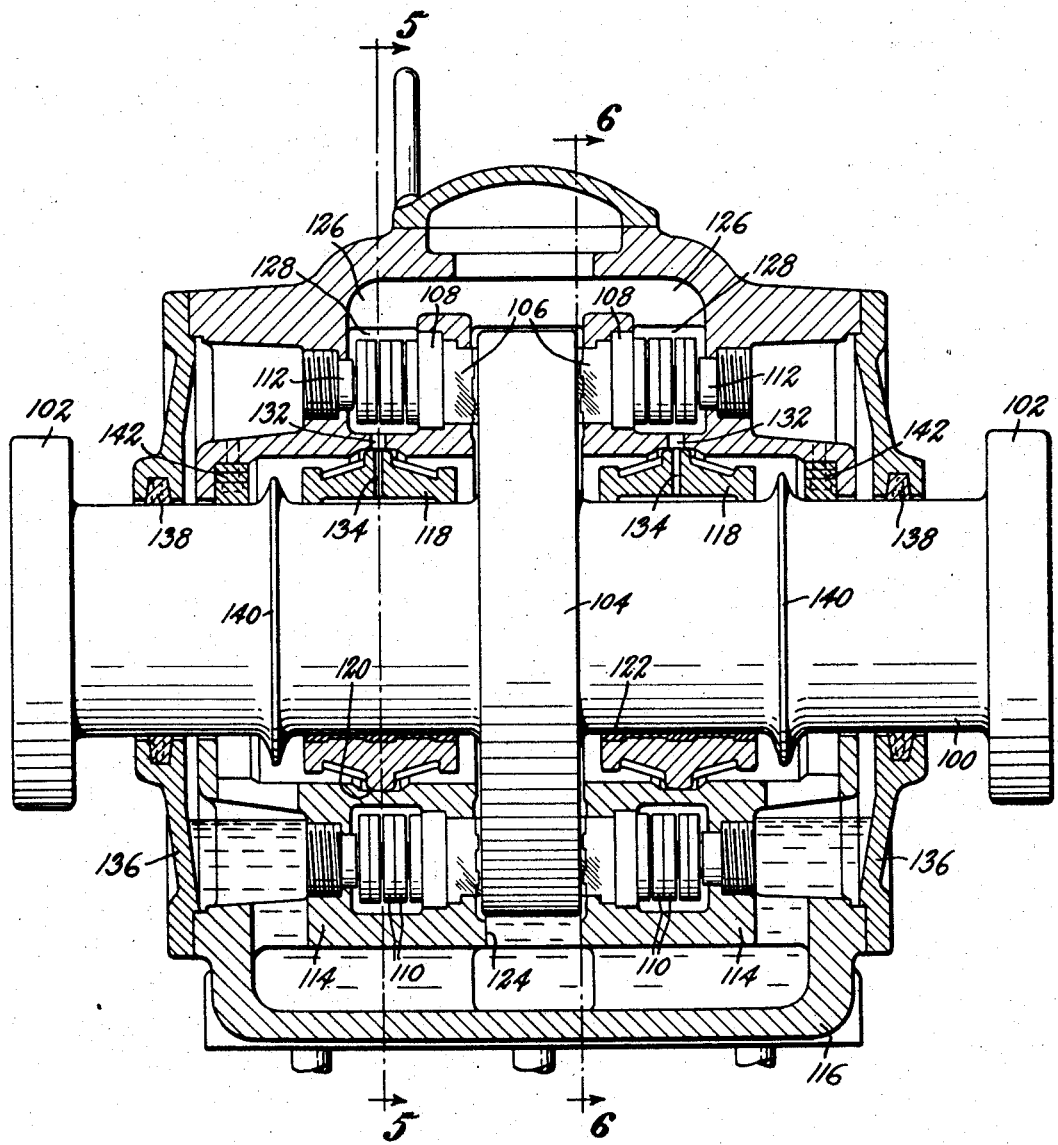

Feb. 27, 1940. A. G. F. WALLGREN 2,191,901
BEARING
Filed Feb. 26, 1936 3 Sheets-Sheet 3
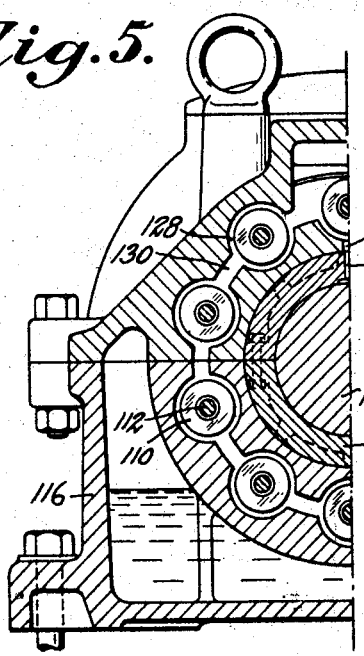
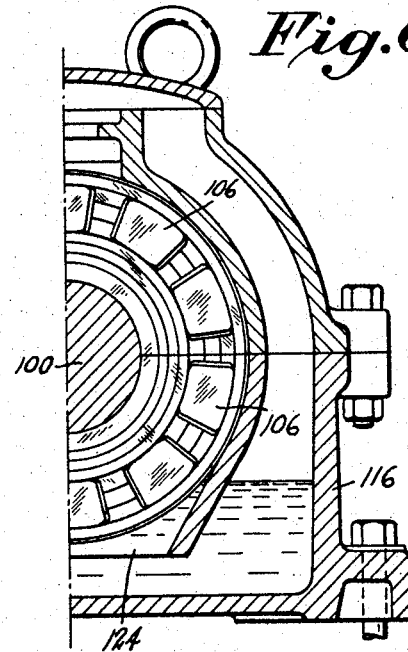
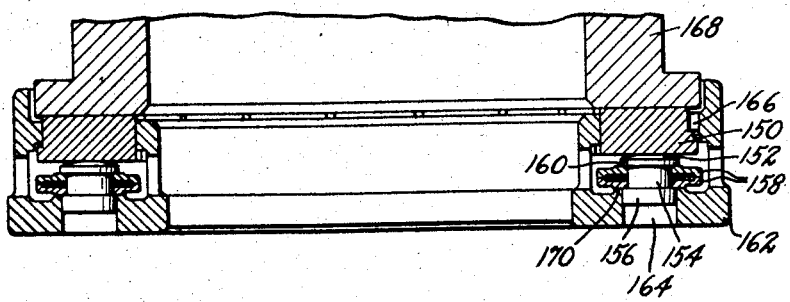

Patented Feb. 27, 1940

2,191,901

UNITED STATES PATENT OFFICE 2,191,901

BEARING

August Gunnar Ferdinand Wallgren, Stockholm, Sweden, assignor, by mesne assignments, to Aktiebolaget Nomy, Lidkoping, Sweden, a corporation of Sweden Application February 26, 1936, Serial No. 65,748
In Sweden March 2, 1935

9 Claims. (Cl. 308—160)

My invention relates to bearings and particularly to thrust bearings of the tilting block type.

In bearings of this type means are provided for creating and maintaining an oil film between the sliding bearing surfaces. It is important that the load be substantially equally distributed among the blocks in order that no one block shall be subjected to such a high load as might disrupt the oil film. Such an unequal distribution of load may result from various causes, probably the most common of which is misalignment of the shaft. In practice it is almost impossible to prevent such misalignment and one of the objects of my invention is to assure an equal distribution of load in spite thereof.

In accordance with my invention the different blocks are individually supported on members which are in turn resiliently mounted. The resilient means supporting these members are given an initial tension that is higher than the normal bearing load to be carried by each block, but lower than the permissible overload, wherefore under normal conditions of operation the resilient means acts as a rigid support. However, in the event that a higher load is imposed on any block, the resilient mounting associated therewith permits the block to be displaced slightly, thus relieving the excess load thereon.

Further objects and advantages of my invention will be apparent from the following description considered in connection with the accompanying drawings, which form a part of this specification, and of which:

Fig. 1 is a cross-sectional view of one embodiment of my invention used in connection with a vertical shaft;

Fig. 2 is a cross-sectional view showing a portion of Fig. 1, but on a larger scale;

Fig. 3 is a cross-sectional view taken on the line 3—3 of Fig. 1;

Fig. 4 is a cross-sectional view showing another embodiment of my invention in connection with a horizontal shaft;

Fig. 5 is a cross-sectional view taken on the line 5—5 of Fig. 4;

Fig. 6 is a cross-sectional view taken on the line 6—6 of Fig. 4; and

Fig. 7 is a cross-sectional view of a third embodiment of my invention.

Referring more particularly to Figs. 1 through 3, reference character 10 designates a vertical shaft of, for instance, an hydraulic turbine. Shaft 10 extends within a bearing housing 12 which is suitably supported in a stationary manner. The lower part of housing 12 is formed with an annular recess in which is positioned a retaining ring 14, which is substantially U-shaped in cross section and is formed with an annular base portion 16 and cylindrical walls 18 and 20. Base portion 16 is formed with a plurality of threaded apertures, the number being equal to the number of bearing blocks, as will appear later. Bolt members 22 are screwed into the threaded apertures in the base portion 16 and are provided at their ends with pins 24 which extend through apertures formed in supporting members 26. Spring members 28 surround members 2 and are compressed between supporting members 26 and shoulders 30 formed on members 22. Spring members 28 may be of any suitable type of stiff spring but as shown they consist of a plurality of separate disc-like members provided with inner annular projections 29 on one side and outer annular projections 31 on the other side thereof. These disc-like members are arranged so that the inner projections 29 of the first and second discs are in contact and the outer projections of the second and third discs are in contact, and so on. The discs are made of resilient material and hence may be deformed in the manner of a stiff spring.

Supporting members 26 abut against shoulders 32 constituting solid abutments formed near the top of cylindrical walls 18 and 20 of retaining ring 14. Consequently, the farther members 22 are screwed into the base portion 16, the greater will be the initial tension produced in spring members 28, the members 22 thus constituting adjustable abutments. Members 22 may be retained in their desired positions of adjustment by setscrews 34.

Tiltably supported on each of members 26 is a bearing block 36. These blocks are provided with radially extending ridges 38, shown in Fig. 3, which are to one side of the centers of the blocks, whereby the blocks are eccentrically supported and will tilt slightly in order to provide wedge-shaped spaces between the bearing surfaces thereon and the cooperating bearing surfaces. These wedge-shaped spaces, when the bearing is rotated, cause a wedge-shaped film of lubricant to be maintained between the aforesaid bearing surfaces. Bearing blocks 36 are provided with flanges 40 which extend under a shoulder 42 formed in cylindrical portion 20 of the retaining ring 14. This prevents the bearing blocks from being accidentally displaced in axial direction. Circular displacement of the blocks is prevented by virtue of the fact that the ends of pins 24 fit loosely within recesses 44 formed in the under surfaces of the blocks.

The upper surfaces of bearing blocks 36 are formed as bearing surfaces and cooperate with a radial bearing surface 46 formed on a sleeve-like member 48 which is secured to the shaft 10. Bearing surface 46 may consist of Babbitt metal or other suitable bearing metal. Sleeve 48 is secured to the shaft by means of a conical locking sleeve 50. The conical surfaces on sleeves 48 and 50 are held in engagement by means of a nut 52 threaded into sleeve 48 and having a flange 54 bearing against the end of sleeve 50. The nut 52 may be retained in position by means of a setscrew 56.

Thrust is transmitted from shaft 10 to sleeve 48 through a two-part ring 58 placed within a groove 60 formed in shaft 10. The parts of ring 58 are held in place by means of a clamping ring 62. Ring 58 bears against another ring 64 interposed between ring 58 and sleeve 48. Thus, clamping sleeve 50 is relieved of substantially all of the thrust and does not have to be secured to shaft 10 firmly enough to be able to transmit this thrust.

The bearing also includes a radial bearing comprising a ring 66 positioned within a cylindrical sleeve 68 which is secured within bearing housing 12. The inner surface of ring 66 is provided with Babbitt metal or the like 70 forming a bearing surface which cooperates with a bearing surface formed on the outside of sleeve 48. Ring 66 is formed with a projection 72 which has a curved outer surface, whereby the ring may tilt within cylindrical member 68 in order to permit the slight wobbling incident to a misaligned shaft.

While the bearing shown in Figs. 1 through 3 is intended primarily for use in connection with an hydraulic turbine where the thrust is normally always in one direction, that is downwardly, it may occur that impulses acting on the turbine runner in an upwardly direction may overcome the weight of the shaft and the runner and cause the shaft to move upwardly, thus creating a thrust in the opposite direction. In order to resist this thrust the lower annular surface of bearing ring 66 is provided with a bearing surface 74 which cooperates with a radial bearing surface 76 formed on sleeve 48. In order to prevent unnecessary frictional losses between these bearing surfaces during normal operation of the bearing, they are held out of contact with each other by means of springs 78 located within recesses formed in bearing ring 66. These springs are retained between sleeves 80 placed in the recesses and flanges formed on pins 82 which pins extend beyond the bearing ring 66 and rest against a flange 84 formed on cylindrical member 68 at the bottom and against a flange 86 formed on a bearing cap 88 on the top.

All of the bearing surfaces are immersed in a bath of lubricant retained within bearing housing 12. A sleeve 90 is connected to the bearing housing and surrounds shaft 10 and extends to a point above the lubricant level within the bearing housing. The cylindrical portions 18 and 20 of retaining ring 14 are provided with openings 92 which serve to permit the free circulation of lubricant. These openings also make it possible to insert the springs 28, supporting members 26 and the bearing blocks 36 within the retaining ring 14. A sleeve 94, supported by cylindrical portion 20, surrounds the thrust bearing surfaces and, in conjunction with cylindrical member 68, tends to confine therein the agitation of the lubricant caused by the rotation of sleeve 48.

The operation of the above described bearing is as follows:

When the bearing is assembled the members 22 are adjusted so that the spring members 28 are given an initial tension which is greater than the tension which would be imposed thereon by the normal load acting on each bearing block, but is less than the permissible overload. The thrust acting in a downwardly direction is transmitted from shaft 10 to sleeve 48, as previously described, and from here is transmitted from the thrust bearing surfaces 46 on the sleeve through wedge-shaped films of lubricant to the bearing blocks 36. From here the thrust is transmitted to the supporting members 26 and thence through spring members 28 to members 22 and the bearing housing. Due to the initial tension given spring members 28, this thrust does not compress them, but merely causes supporting members 26 to press with less force against the shoulders 32 formed on cylindrical portions 18 and 20 of the retaining ring 14.

However, should shaft 10 be slightly out of alignment so that it tends to wobble and thus concentrate thrust on individual bearing blocks, the blocks so affected cause the resilient members 28 supporting the respective members 26 to be compressed slightly, thus relieving the bearing blocks of the excess load. Consequently, the film of lubricant between any one bearing block and the thrust bearing surface 46 cannot be subjected to such a high thrust load that it will be disrupted. Before this happens the spring members 28 will be distorted slightly, thus permitting the bearing block to be displaced which causes the thrust to be distributed among other bearing blocks.

The embodiment shown in Figs. 4 through 6 consists of a thrust bearing for use in connection with a horizontal shaft such as the driving shaft of a ship. Inasmuch as the shaft 100 is normally provided with forged flanges 102 at either end thereof for the purpose of coupling it to adjacent shaft sections, all of the bearing parts which surround the shaft must be made in two pieces in order that they may be assembled.

The shaft 100 is provided with a radial flange 104 the opposite sides of which form the rotating thrust bearing surfaces. Bearing blocks 106 are located on either side of flange 104 and are tiltably supported on supporting members 108, which correspond to members 26 in the previous embodiment. These supporting members are in turn supported by means of spring members 110 mounted on members 112 which are threaded into retaining rings 114 which may be cast integral with the bearing housing 116.

Radial load on the shaft 100 is carried through stationary bearing rings 118 which are tiltably supported on the inner surfaces 120 of retaining rings 114. The bearing surfaces 122 of rings 118 cooperate directly with cylindrical bearing surfaces formed on the shaft.

The lower part of each retaining ring 114 is formed with a lubricant passage 124 through which lubricant flows to flange 104 and is lifted by the rotation of the flange to the upper part of the bearing. From here it flows through channels 126 into the spaces 128 surrounding the spring members 110 at the upper part of the bearing, from whence it flows through channels 130 which connect the different spaces 128. The opposite sides of the retaining rings 114 are constricted to form channels 130 in order that an excessive amount of lubricant will not be required to fill these spaces. Lubricant may also flow from spaces 128 at the top of the bearing through passages 132 and through channels 134 in the bearing rings 118 to the radial bearing surfaces. The presence of lubricant in spaces 128 and channels 130 assures an adequate supply of lubricant to the thrust bearing surfaces.

The bearing housing is closed by end caps 136 which carry lubricant packings 138. The shaft is also formed with flanges 140 which tend to prevent lubricant from creeping toward the outside of the bearing. To the same effect oil scrapers 142 are provided which contact the shaft outside said flanges.

The operation of this embodiment is substantially the same as that previously described, the springs 110 acting as rigid supports under conditions of normal load, but being deformable to permit displacement of the blocks 106 in order to relieve overload on individual blocks. In ship installations the thrust bearing must be capable of absorbing thrust in either direction, inasmuch as when the engines are reversed to drive the ship backwards and the propeller is hence rotated in a reverse direction, the thrust is likewise reversed. Consequently bearing blocks 126 are provided on both sides of flange 104. In installing these blocks, care must be taken that the eccentric supporting ridges, such as are shown at 48 in Fig. 3, are provided at the proper sides of the center of the blocks on each side of the bearing. The bearing blocks on one side of flange 104 are called upon to transmit thrust only when the shaft is rotating in one direction, while the blocks on the other side of the flange transmit thrust only when the shaft is rotating in the reverse direction. In both cases, the supporting projections on the blocks should be behind the center of the blocks with respect to the direction of rotation for which each particular block must support thrust.

In the embodiment shown in Fig. 7 the bearing blocks 150 are tiltably supported directly on the rounded ends 152 of bolts 154. These bolts are provided with nuts 156 threaded thereon and spring members 158 are retained and stressed between the nuts 156 and flanges 160 on the bolts. As shown, the spring members 158 comprise only two disc members, but obviously a greater number could be employed if desired. Inasmuch as the spring members are retained between the nuts 156 and the flanges 160, all of the stress incident to the initial tensioning of the spring members is carried entirely by the bolts 154 and the nuts 156, and the retaining ring 162 is not subjected to any of this stress.

Nuts 156 are received within apertures 164 formed in the bearing housing and the bolts 154 are thus retained in proper position. Bearing blocks 150 are held against rotation by means of keys 166 inserted in keyways formed in the bearing housing and in the blocks. The fit between the keys 166 and the bearing blocks 150 is sufficiently loose so that there is no interference with the desired tilting of the blocks. The blocks and the bolts are so positioned with respect to each other that the former are supported on the rounded ends 152 of the latter at a point eccentric with respect to the center of the blocks.

As in the previous embodiments, the spring members 158 are given an initial tension which is greater than the normal load acting on the individual blocks but is less than the overload which would disrupt the oil films formed between the blocks 150 and the bearing surface formed on bearing member 168 which rotates with the shaft. In the event that the load on any one block tends to become too high, this block may be displaced axially by compressing spring member 158. The lower end of the spring members abut against an annular shoulder 170 formed on the retaining ring 162 and bolts 154 and nuts 156 may slide within apertures 164 when the bearing block is displaced.

As is clear from the drawings, thrust is transmitted from bearing member 168 through the lubricant film to blocks 150 and thence through bolts 154 and spring members 158 to shoulders 170 on the retaining ring.

While I have shown and described three more or less specific embodiments of my invention adapted for more or less specific uses, it is to be understood that this has been done for purposes of illustration only, and the scope of my invention is not to be limited thereby but is to be determined by the appended claims viewed in the light of the prior art.

What I claim:

1. In a block bearing, a bearing member, a plurality of separate rigid supporting members, a bearing block supported by each of said members, resilient means for individually supporting each of said members, and means for permanently imparting an initial tension to each of said resilient means which is greater than the normal load on each bearing block and less than the permissible overload on each bearing block, the area of contact between said supporting member and the respective blocks being of such limited extent in peripheral direction as to provide a fulcrum, whereby the blocks are tiltable about said fulcrum with respect to the supporting members and independently of said resilient means.

2. In a block bearing, a bearing member, a plurality of separate rigid supporting members, a bearing block supported by each of said members, a stationary abutment, resilient means for individually supporting and forcing each supporting member against said abutment, and means for imparting an initial tension to said resilient means which is greater than the normal load on each bearing block and less than the permissible overload on each bearing block, the area of contact between said supporting members and the respective blocks being of such limited extent in peripheral direction as to provide a fulcrum, whereby the blocks are tiltable about said fulcrum with respect to the supporting members and independently of said resilient means.

3. In a block bearing, a bearing member, a plurality of bearing blocks cooperating with said bearing member, a separate rigid supporting member for supporting each of said bearing blocks, a stationary abutment, a plurality of adjustable abutments, and springs between said adjustable abutments and said supporting members for individually forcing each supporting member against said stationary abutment, said adjustable abutments being adjustable to impart an initial tension to each of said springs which is greater than the normal load on each bearing block and which is less than the permissible overload on each bearing block, the area of contact between said supporting members and the respective blocks being of such limited extent in peripheral direction as to provide a fulcrum, whereby the blocks are tiltable about said fulcrum with respect to the supporting members and independently of said springs.

4. In a block bearing, a bearing member, a plurality of bearing blocks cooperating with said bearing member, a separate supporting member for tiltably supporting each of said bearing blocks, a stationary abutment, a plurality of bolts constituting adjustable abutments, and springs between said bolts and said supporting members for individually forcing each supporting member against said stationary abutment, said bolts being adjustable to impart an initial tension to each of said springs which is greater than the normal load on each bearing block and which is less than the permissible overload on each bearing block, said bolts engaging recesses formed in the respective supporting members and bearing blocks for retaining said supporting members and bearing blocks against rotation.

5. In a thrust bearing of the tilting block type for a rotatable shaft, a stationary bearing housing around said shaft, a rotatable bearing member carried by said shaft within said housing, a retaining ring stationary with respect to said housing, a plurality of adjustable abutments carried by said ring, a plurality of separate rigid supporting members carried by said ring, resilient means between said abutments and said supporting members, and a bearing block supported by each of said supporting members and cooperating with said bearing member, the area of contact between said supporting members and the respective blocks being of such limited extent in peripheral direction as to provide a fulcrum, whereby the blocks are tiltable about said fulcrum with respect to the supporting members and independently of said resilient means.

6. In a block bearing, a bearing member, a plurality of bearing blocks cooperating with said bearing member, a separate bolt for supporting each of said bearing blocks, heads on said bolts, nuts threaded on said bolts, resilient means initially tensioned between said nuts and said heads, and a stationary member, one end of said resilient means bearing against said stationary member, the supporting surfaces of said bolts being rounded so as to provide an area of contact between the bolts and the respective blocks having such limited extent in peripheral direction as to constitute a fulcrum, whereby the blocks are tiltable about said fulcrum with respect to the supporting members and independently of said resilient means.

7. In a block bearing, a bearing member, a plurality of bearing blocks cooperating with said bearing member, a separate bolt having a rounded head for supporting each of said bearing blocks, nuts threaded on said bolts, spring members initially tensioned between said nuts and said heads, and a retaining ring having recesses for movably receiving said bolts, one end of said spring members bearing against said retaining ring for transmitting thrust thereto, the rounded heads of said bolts providing an area of contact with the respective blocks having such limited extent in peripheral direction as to constitute a fulcrum, whereby the blocks tilt about said fulcrum with respect to the supporting members and independently of said springs.

8. In a thrust block bearing, a bearing ring, a retaining ring having an annular base portion and concentric cylindrical walls, bearing blocks positioned between said walls and cooperating with said bearing ring, a separate supporting member for each block positioned between said walls, bolt members threaded into said base portion, and resilient means between said bolt members and said supporting members, said bolt members being adjustable to impart an initial tension to said resilient means which is greater than the normal thrust load acting on each bearing block and which is less than the overload required to disrupt the oil film between said bearing blocks and said bearing ring, the area of contact between said supporting members and the respective blocks being of such limited extent in peripheral direction as to provide a fulcrum, whereby the blocks are tiltable about said fulcrum with respect to the supporting members and independently of said resilient means.

9. In a thrust block bearing, a bearing ring, a retaining ring having an annular base portion and concentric cylindrical walls, bearing blocks positioned between said walls and cooperating with said bearing ring, bolt members movably retained in said base portion and having heads for tiltably supporting said bearing blocks, nuts threaded on said bolt members, and spring members retained between said nuts and said heads, said nuts being adjustable to impart an initial tension to said spring members which is greater than the normal thrust load imposed on each of said bearing blocks and less than the overload required to disrupt the oil film between said bearing blocks and said bearing ring, one end of said spring members bearing against said base portion to transmit thrust thereto.

AUGUST GUNNAR
FERDINAND WALLGREN.